(12) United States Patent
Utsumi et al.

(10) Patent No.: US 8,237,893 B2
(45) Date of Patent: Aug. 7, 2012

(54) LIQUID CRYSTAL DISPLAY DEVICE

(75) Inventors: Yuka Utsumi, Hitachi (JP); Shintaro Takeda, Hitachi (JP); Ikuo Hiyama, Hitachinaka (JP); Kikuo Ono, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 171 days.

(21) Appl. No.: 12/709,229

(22) Filed: Feb. 19, 2010

(65) Prior Publication Data

US 2010/0245726 A1    Sep. 30, 2010

(30) Foreign Application Priority Data

Mar. 26, 2009    (JP) ................................ 2009-075421

(51) Int. Cl.
 *G02F 1/1335* (2006.01)
 *G02F 1/1343* (2006.01)
 *C09K 19/02* (2006.01)
(52) U.S. Cl. ............. 349/96; 349/61; 349/141; 349/167
(58) Field of Classification Search ............... 349/96–98
 See application file for complete search history.

(56) References Cited

U.S. PATENT DOCUMENTS

| | | | | |
|---|---|---|---|---|
| 5,124,825 | A * | 6/1992 | Asano et al. ................... | 349/136 |
| 6,693,693 | B1 * | 2/2004 | Okita et al. .................... | 349/119 |
| 2002/0047974 | A1 | 4/2002 | Matsumoto | |
| 2003/0058385 | A1 * | 3/2003 | McKnight et al. ............. | 349/96 |
| 2005/0068480 | A1 | 3/2005 | Hiyama et al. | |
| 2006/0268198 | A1 | 11/2006 | Utsumi et al. | |
| 2010/0245726 | A1 * | 9/2010 | Utsumi et al. .................. | 349/96 |

FOREIGN PATENT DOCUMENTS

| | | |
|---|---|---|
| JP | 2002-62544 | 2/2002 |
| JP | 2005-128498 | 5/2005 |
| JP | 2006-330215 | 12/2006 |
| WO | WO 97/39380 | 10/1997 |

OTHER PUBLICATIONS

Makoto Yoneya et al., Depolarized light scattering from liquid crystals as a factor for black level light leakage in liquid-crystal displays, Journal of Applied Physics 98, 2005, Pp016106.
Yuka Utsumi et al., P-27: Analysis of Light-Leakage Caused by Colour Filters for Improving Contrast Ratio of LCD TVs, EuroDisplay, 2005, pp. 301-304.
Y. Utsumi et al., Reduced Light Scattering Intensity from Liquid Crystal Layers for Higher Contrast Ratio in IPS-Pro LCDs, LCTp&-12L, International Display workshop, 2007, pp. 1749-1750.

* cited by examiner

*Primary Examiner* — Dung T. Nguyen
(74) *Attorney, Agent, or Firm* — Antonelli, Terry, Stout & Kraus, LLP.

(57) ABSTRACT

A liquid crystal display device comprising a liquid crystal panel having a cell 15 and polarizing plates 11, 12; wherein a liquid crystal molecule is rotated in parallel to the cell 15, the polarizing plate 12 has a multiple polarizer layer formed thereon, the multiple player having a first polarizer layer having a higher polarization degree with respect to a light from a forward direction than a polarization degree with respect to a light from a oblique direction and a second polarizer layer having a higher polarization degree with respect to a light from a oblique direction than a polarization degree with respect to a light from a forward direction, and an average elastic constant of a splay elastic constant K1, a twist elastic constant K2, and a bend elastic constant K3 of liquid crystal material is equal to $10 \times 10^{-12}$ N or larger and satisfies a relationship of $K1/K2 <= 1.5$.

10 Claims, 6 Drawing Sheets

LIQUID CRYSTAL DISPLAY DEVICE

CROSS-REFERENCE TO RELATED APPLICATION

The present application claims priority from Japanese application JP2009-075421 filed on Mar. 26, 2009, the content of which is hereby incorporated by reference into this application.

BACKGROUND OF THE INVENTION

1. Field of the Invention

The present invention relates to a liquid crystal display device having wide viewing angle characteristics and high performance of image quality capable of maintaining a high contrast ratio.

2. Description of the Related Art

A liquid crystal display has a strength, compared to a CRT (Cathode Ray Tube, generally referred to as CRT), or a conventional mainstream of display devices, in that the display device can be formed thin and light. As development of a technique for improving image quality, use and market for liquid crystal displays have been expanded.

In recent years, for example, a monitor of a desk top personal computer or for printing or designing, use of a liquid crystal television has been increased. With increase of use as a liquid crystal television, there are demanding requests for preferable color reproducibility and a higher contrast ratio. As a luminance in a black state has a finite value (hereinafter referred to as a black luminance) rather than zero, a contrast ratio of a liquid crystal display device is defined by a value obtained by dividing a luminance in a white state (hereinafter referred to as a white luminance) by a black luminance, the white luminance being defined by effective transmissivity of a liquid crystal panel.

As a luminance of a liquid crystal display device depends on a viewing angle, the above-described contrast ratio is often discriminated between a front contrast ratio and a viewing angle contrast ratio. The former is a value defined by a luminance value measured on the front surface of a panel, being specifically a luminance defined by a two-degree viewing field, that is, a luminance measured on a luminance photometer, while the latter is a contrast ratio obtained when viewing a liquid crystal display from a oblique direction and being strongly dependent on viewing angle characteristics of a polarizing plate.

A liquid crystal display mode affects viewing angle characteristics. In general, in a display mode in which a direction of an electric field for driving liquid crystal is perpendicular or nearly perpendicular to a pair of substrates holding a liquid crystal layer in-between, that is, a plane of the liquid crystal display device (a plane viewed by an observer), a contrast ratio (a viewing angle contrast ratio) for a oblique direction significantly drops. In particular, in a black state, a contrast for a oblique direction drops due to remarkable light leakage in a oblique direction. In order to reduce such oblique light leakage, generally, an optical retarder is used or viewing angle characteristics of a polarizing plate are compensated for.

Here, as a liquid crystal display mode, an IPS (In Plane Switching) type liquid crystal display device is available in which a plurality of electrodes are formed on one substrate and the liquid crystal is driven by an electric field formed between the electrodes. In such an IPS type liquid crystal display device, liquid crystal molecules are rotated by applying an electric field in a direction of a plane in parallel to a pair of substrates holding a liquid crystal layer in-between. Although on principle, the liquid crystal layer has wide viewing angle characteristics, the IPS type liquid crystal display device employs a phase compensation technique for further compensating for the viewing angle characteristics of a polarizing plate.

Note that, as a general technique for improving viewing angle characteristics, Japanese Patent Laid-open Publication No. 2005-128498 discloses an IPS type liquid crystal display device using a retardation film, in which the upper polarizing plate and lower polarizing plate in use each has positive uniaxiality.

As a factor which decreases a contrast ratio, not only the above-described viewing angle characteristics but also partial depolarization by respective members in a liquid crystal panel (formed using a polarizing plate, a substrate, and a plurality of kinds of layers in the substrate, except a backlight unit) has significant influence. In particular, a black state in a normally black type liquid crystal display device (black state with no electric field being applied) generally used in a liquid crystal television is displayed by blocking a polarized light passed through a polarizing plate provided on a backlight side (hereinafter referred to as a polarizer) by a polarizing plate provided on an opposite side of a backlight side (hereinafter referred to as an analyzer; in a normally black type liquid crystal display device, an analyzer and a polarizer are positioned such that respective polarization axes are orthogonal to each other at substantially 90 degrees).

A polarized light having passed through the polarizer is subjected to partial depolarization when passing through the liquid crystal panel, partially depolarized light leaks from the analyzer.

This increases a luminance in a black state and thereby deteriorates black state quality. Notes that a partial depolarization member and influence thereof is reported in "M. Yoneya et al., J. Appl. Phys., 98 (2005), p. 016106." "Y. Utsumi et al., EuroDisplay' 05, P-27." and "Y. Utsumi et al., IDW'07, LCTp7-12L". These documents include descriptions about light leakage due to scattering by fine pigment particles in a color filter layer or disordered orientation of liquid crystal and so forth. Further, the document "Y. Utsumi et al., IDW'07, LCTp7-12L." reports that there is a correlation between intensity of light leakage from a liquid crystal layer and an average elastic constant (an average of a splay elastic constant $K1$, a twist elastic constant $K2$, and a bend elastic constant $K3$), and that increase of the average elastic constant results in decrease of light leakage.

SUMMARY OF THE INVENTION

A liquid crystal display device used as a liquid crystal television generally utilizes polarized light. That is, a light from a light source unit (backlight) on the back surface of a liquid crystal panel is polarized, and the polarized light will change depending on the state of orientation of the liquid crystal layer before being output with desired intensity, so that an image can be shown. The state of orientation of liquid crystal is controlled according to the strength of an electric field applied from electrodes formed on the substrate. A display manner for blocking light with no electric field applied and passing light by applying an electric field is referred to as a normally closed mode or normally black mode, and is generally employed in a liquid crystal television.

A high contrast ratio is an image quality strongly desired for a television, and in order to enhance a contrast ratio, reduction of a luminance of black which is displayed by blocking light is important. That is, for a higher contrast ratio, a normally closed mode in which light is blocked when liquid crystal is in the state of orientation with no electric field applied is more effective in blocking light than a normally white mode in which light is blocked when liquid crystal is in the state of orientation having been changed due to an electric field applied.

In a normally closed mode, in which black is displayed with no electric field applied, it is important that a degree of polarization of an incident polarized light, that is, a degree of polarization by a polarizer provided between a light source and a liquid crystal layer, is very high. If a polarized light having passed through the polarizer and being introduced into the liquid crystal layer is fully maintained when passing through the liquid crystal layer in the initial orientation state, the polarized light is blocked by the analyzer which is placed by an observer such that the polarization axis thereof is orthogonal to the polarization axis of the polarizer. A polarizing plate generally used as the polarizer or the analyzer is formed by dying polyvinyl alcohol with iodine or dichroic dye and then stretching, and the polarization degree of such a polarizing plate is generally significantly high.

However, the above described polarizing plate generally presents a high polarization degree only with respect to a vertical direction with respect to a plane viewed by an observer, that is, only when a light is incoming perpendicular to the plane, but presents only a remarkably poorer polarization degree with respect to a light incoming from a oblique direction. In a liquid crystal display device, as light is incoming from the light source unit (back light) to the lower polarizing plate of the liquid crystal panel at all azimutal angles and substantially all polar angles, degradation of a polarization degree of a light incoming from a oblique direction may cause increase of oblique light leakage. Note that the maximum angle of an incoming angle from a polar angle direction is generally about 85 degrees with the vertical direction defined at 0 degree, though the maximum angle is determined depending on the distance between the surface of the back light unit and the liquid crystal panel.

Here, the above-described Japanese Patent Laid-open Publication No. 2005-128498 discloses that a viewing angle contrast ratio is improved using a retardation film, that is, that oblique light leakage in a black state is reduced. However, as the purpose of a retardation film is to change the phase of an incoming polarized light through birefringence, there is a problem that a refractive index is depend on a wavelength of a visible light. For example, when a retardation film for preventing light leakage with respect to a wavelength 550 nm (green light most highly perceived by human eyes and influential in luminance) is used, light leakage cannot be sufficiently prevented with respect to wavelength areas for blue having shorter wavelength (e.g., from 430 to 480 nm) and red having longer wavelength (from 600 to 700 nm), and resultantly light leaks. As a result, colors of cyan and magenta are occurred, which deteriorates black state quality in a oblique direction.

Meanwhile, although the documents "M. Yoneya et al., J. Appl. Phys., 98 (2005), p. 016106", "Y. Utsumi et al., Euro-Display' 05, P-27", and "Y. Utsumi et al., IDW' 07, LCTp7-12L" include a description about light leakage in a forward direction due to partial depolarization, a means for improving viewing angle characteristics, that is, a means for suppressing light leakage in a oblique direction, has been rarely discussed so far. One of the reasons why such a means has not been discussed is that, as described above, light leakage in a oblique direction is mainly due to viewing angle characteristic of a polarizing plate, and a member inside a liquid crystal panel is not a major cause of such light leakage. In addition, there is a problem of coloring in improving viewing angle characteristic using a retardation film. This is another reason why such a means has not been discussed.

The present invention aims to provide a liquid crystal display device for reducing oblique light leakage from a liquid crystal layer when using a polarizing plate for improving a polarization degree for a oblique direction to thereby improve viewing angle characteristics in a black state and viewing angle characteristics related to a contrast ratio.

In order to achieve the above described object, a liquid crystal display device according to the present invention is a liquid crystal display device, comprising: a liquid crystal panel having two substrates holding a liquid crystal layer in-between and two polarizing plates placed outside the two substrates; and a light source unit for emitting light toward the liquid crystal panel, wherein a liquid crystal molecule in the liquid crystal layer is rotated by applying an electric field in a direction of a plane in parallel to the two substrates, the polarizing plate placed on the light source unit side has a multiple polarizer layer formed thereon, the multiple polarizer layer including a first polarizer layer having a higher polarization degree with respect to a light incoming from a forward direction than a polarization degree with respect to a light incoming from a oblique direction and a second polarizer layer having a higher polarization degree with respect to a light incoming from a oblique direction than a polarization degree with respect to a light incoming from a forward direction is formed on, and an average elastic constant of a splay elastic constant K1, a twist elastic constant K2, and a bend elastic constant K3 of liquid crystal material enclosed in the liquid crystal layer is equal to $10 \times 10^{-12}$ N or larger and satisfies a relationship of K1/K2<=1.5.

In an embodiment of the present invention, the first polarizer layer may be formed using a polarizer layer having positive uniaxiality, the second polarizer layer may be formed using a polarizer layer having negative uniaxiality, and the first polarizer layer and the second polarizer layer may be laminated in the multiple polarizer layer such that absorption axes thereof are aligned in parallel to each other.

In an embodiment of the present invention, the splay elastic constant K1, the twist elastic constant K2, and the bend elastic constant K3 may satisfy a relationship of K1/K3<=2/3 and K2/K3<=1/2.

In an embodiment of the present invention, the splay elastic constant K1 may be equal to or smaller than $12 \times 10^{-12}$N, and the twist elastic constant K2 may be equal to or smaller than $8 \times 10^{-12}$ N.

In an embodiment of the present invention, the splay elastic constant K1 may be equal to or smaller than $10 \times 10^{-12}$ N.

In an embodiment of the present invention, the splay elastic constant K1 may be in a range between $9 \times 10^{-12}$ N and $10 \times 10^{-12}$ N, the twist elastic constant K2 may be in a range between $6 \times 10^{-12}$ N and $8 \times 10^{-12}$N, and the bend elastic constant K3 may be equal to or larger than $15 \times 10^{-12}$ N).

In an embodiment of the present invention, the second polarizer layer may be placed in a position closer to the liquid crystal layer than the first polarizer layer is in the multiple polarizer layer.

In an embodiment of the present invention, the multiple polarizer layer may have an optically substantially isotropic layer between the first polarizer layer and the second polarizer layer.

In an embodiment of the present invention, the polarizing plate placed on a side of the light source unit may have a polarization degree being 99.8 or larger with respect to a light incoming from a direction at an azimutal angle being 45 degrees and a polar angle being 45 degrees relative to a polarization axis in a plane of the polarizing plate.

In an embodiment of the present invention, anisotropy of refractive index of the liquid crystal material may be between 0.07 and 0.09.

According to the present invention, it is possible to provide a liquid crystal display device capable of suppressing light leakage in a oblique direction in a black state and having preferable viewing angle characteristics.

DETAILED DESCRIPTION OF THE INVENTION

In the following, an embodiment and examples of a liquid crystal display device according to the present invention will be described while referring to the accompanying drawings. However, the present invention is not limited to the description below, but can be adapted to various changes and modifications made by a person skilled in the art within the technical scope of this invention.

Figure 1:
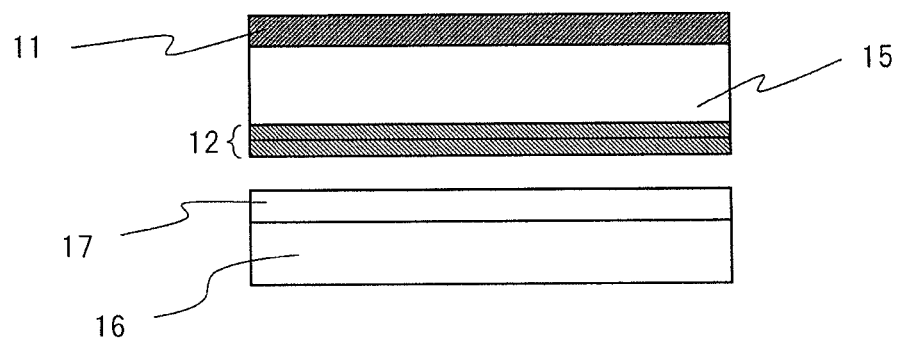
FIG. 1 is a schematic cross sectional view showing one example of a structure of a liquid crystal display device according to one embodiment of the present invention.
Figure 2:
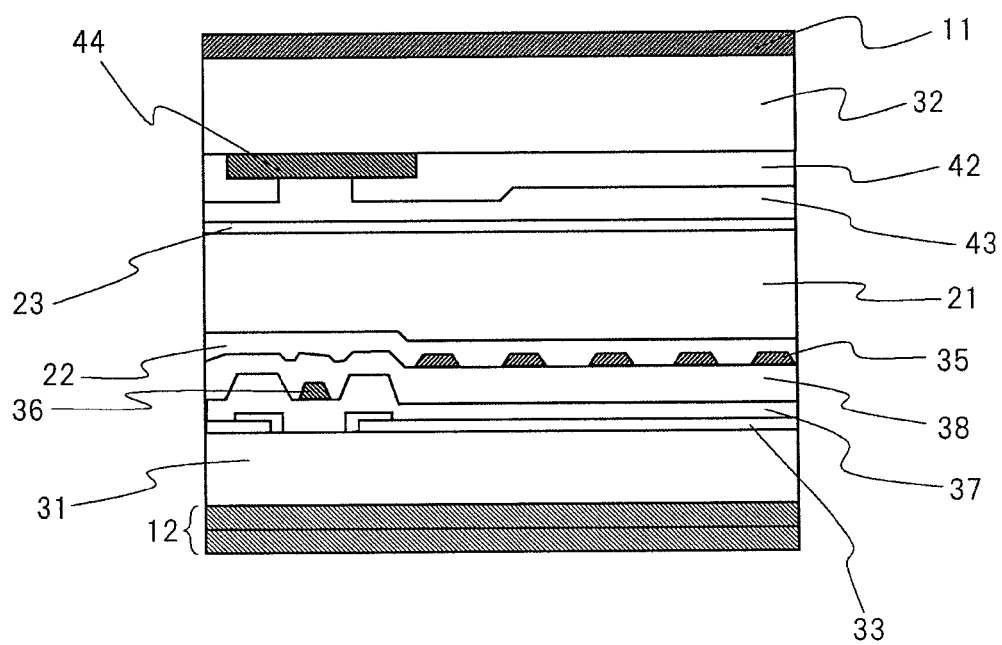
FIG. 2 is a schematic cross sectional view showing an area near one dot in a liquid crystal display device according to one embodiment of the present invention.
Figure 3:
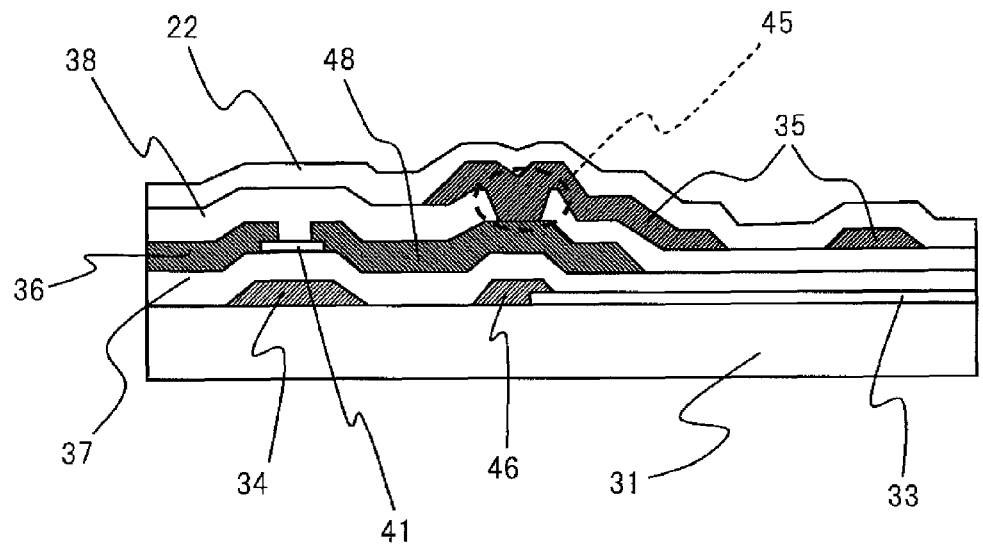
FIG. 3 is a schematic view showing an area near one dot on an active matrix substrate of a liquid crystal display device according to one embodiment of the present invention.
Figure 4:
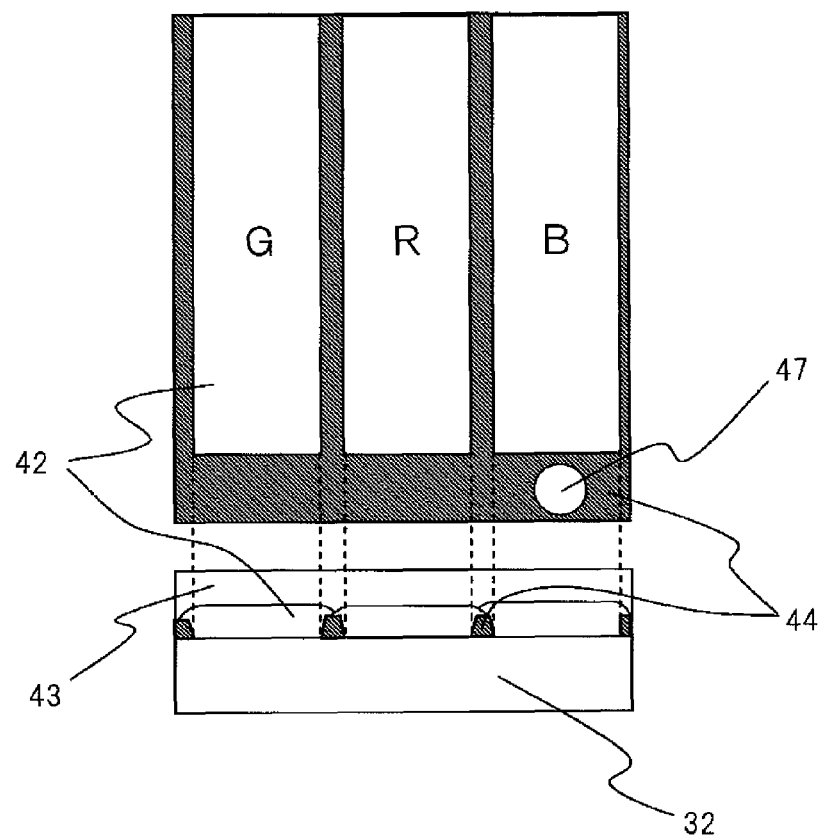
FIG. 4 is a schematic view showing an area near one pixel on a color filter substrate of a liquid crystal display device according to one embodiment of the present invention.

FIG. 1 is a schematic cross sectional view explaining a liquid crystal display device according to this embodiment. A liquid crystal display device according to this embodiment comprises a liquid crystal cell 15, an upper polarizing plate (analyzer) 11 and a lower polarizing plate (polarizer) 12 provided outside the liquid crystal cell 15, an optical seat 17, and a light source unit 16. The light source unit 16 supplies light to a liquid crystal panel via the optical seat 17, the liquid crystal panel having the analyzer 11 and the polarizer 12 provided on the respective outside surfaces of the liquid crystal cell 15. FIG. 2 is a schematic cross sectional view showing an area near one dot in a liquid crystal display device according to this embodiment. FIG. 3 is a schematic view showing an area near one dot on an active matrix substrate of a liquid crystal display device according to this embodiment; FIG. 4 is a schematic view showing an area near one pixel (comprising three primary colors, namely, R, G, B dots, in this embodiment) on a color filter substrate of a liquid crystal display device according to this embodiment.

On the active matrix substrate 31, there are formed a common electrode 33 made of ITO (indium-tim-oxide), a gate electrode 34 made of Mo/Al (molybdenum/aluminum), and a common electrode wire (common wire) 46 formed on the common electrode 33. Further, a gate insulator 37 made of silicon nitride is formed, covering the common electrode 33, the gate electrode 34, and the common electrode wire 46. Still further, a semiconductor layer 41 made of either amorphous silicon or polysilicon is formed on the gate electrode 34 via the gate insulator 37, functioning as an active element and as an active layer of a thin film transistor (TFT). Yet further, a signal electrode (drain electrode) 36 and a pixel electrode (source electrode) wire 48 both made of Cr/Mo (chromium/molybdenum) are formed, covering a part of the pattern of the semiconductor layer 41. Still further, a protection insulator 38 made of silicon nitride is formed covering all of the above described layers and so forth.

Figure 5:
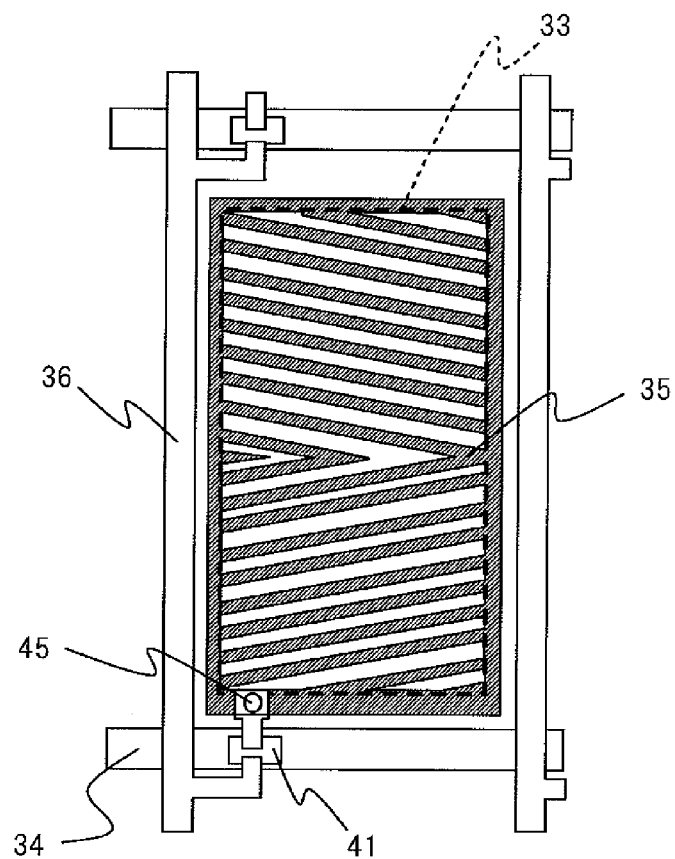
FIG. 5 is an enlarged plan view of a dot of a liquid crystal display device according to one embodiment of the present invention.

As shown in FIG. 3, an ITO pixel electrode (source electrode) 35 is formed on the protection insulator 38, being connected to a metal (Cr/Mo) pixel electrode (source electrode) wire 48 through a through-hole 45 formed on the protection insulator 38. FIG. 5 is an enlarged plan view of a dot of a liquid crystal display device according to this embodiment. As shown in FIG. 5, an ITO common electrode (common electrode) 33 is formed like a panel in an area of one dot such that an ITO pixel electrode (source electrode) 35 is formed inclined by about eight degrees in a comb-like shape. A liquid crystal display device according to this embodiment is of 32 inches diagonally, having the number of dots for WXGA.

Thereafter, as shown in FIG. 4, processes for coating, pre-bake, exposure, development, ashing and cleaning, and post-bake are carried out using a black resist made by Tokyo Ohka Kogyo Co., Ltd. and a photolithographic method, or an ordinary method, to form a black matrix 44 on a color filter substrate 32. Note that although the film thickness is determined as 1.5 μm in this embodiment, the film thickness may be determined in accordance with a black resist in use so that the optical density being substantially three or larger is resulted. Thereafter, using color resists of three colors and a photolithographic method, or an ordinary method, processes of coating, pre-bake, exposure, development, ashing and cleaning, and post-bake are carried out to form a color filter. Note that although a film thickness is determined as 3.0 μm for blue, 2.8 μm for green, and 2.7 μm for red in this embodiment, a film thickness may be determined in accordance with desired color purity or the thickness of a liquid crystal layer. Also note that, although a black matrix is formed surrounding one dot in this embodiment, a black matrix may be formed in an area on the active matrix substrate 31, the area covering the gate electrode 34. A color filter substrate 32 formed using a method generally referred to as an ink-jet method may be used.

Thereafter, for planarization and protection of the color filter layer 42, an overcoat layer 43 is formed using V-259 by Nippon Steel Chemical Co., Ltd. Specifically, the overcoat layer 43 is formed through exposure by irradiating light of an amount 200 mJ/cm$^2$, using an i line of a high pressure mercury lamp, and then by heating at 200° C. for thirty minutes. The thickness of the resultant overcoat layer 43 is about 1.2 to 1.5 μm on a dot. Note that when dirt from the color filter layer 42 can be completely prevented, the overcoat layer 43 may not be necessary. Thereafter, a post spacer 47 of about 3.9 μm high is formed on a black matrix held between blue dots, using photosensitive resin and also a photolithographic method, or an ordinary method, and an etching process. The post spacer 47 can be formed in any location, upon necessary, as the location thereof is not limited to this embodiment.

Alternatively, the post spacer 47 may be selectively formed as a ball spacer through printing or using an ink-jet method or the like.

On the active matrix substrate 31 and color filter substrate 32, polyamic acid varnish is printed, and then heated at 210° C. for thirty minutes, whereby alignment layers 22, 23 made of a closely densed polyimide film of about 100 nm are formed, respectively. The layers 22, 23 are then rubbed. Note that an alignment layer material in this embodiment is not limited to any particular material, and, e.g., polyimide using 2,2-bis[4-(p-aminophnoxy) phenyl propane] as diamin compound and pyromellitic dianhidride as acid anhydride or polyimide using p-phenylene diamin, diaminodiphenyl methane, and so forth, as amin component, and aliphatic tetra carboxylic acid dianhydride or pyromellitic dianhidride as acid anhydride component may be used. Note that although a rubbing method is used in this embodiment, this is not an exclusive example. For example, an alignment layer may be formed using photosensitive alignment layer material by irradiating polarized ultraviolet light or using an ion beam method using diamond like carbon. The liquid crystal orientation direction is defined as a direction in which the gate electrode 34 extends in FIG. 5, that is, a horizontal direction of the diagram. Thereafter, the two substrates (the active matrix substrate 31 and the color filter substrate 32) are placed together such that respective alignment layers 22, 23 having liquid crystal aligning capacity face each other, and the periphery is sealed, whereby the liquid crystal cell 15 is formed. In formation of the liquid crystal cell 15, nematic liquid crystal composite is enclosed.

The structure of the light source unit 16 may be of a direct type using twelve three band fluorescent lamps as a light source, in which an optical seat 17 is provided between the light source unit 16 and the liquid crystal panel. The optical seat 17 includes a diffuser and three diffusing sheets, constituting an optical system of a backlight in this embodiment. Note that the structure of the optical seat 17 is not limited to this embodiment, and may be a structure using not only a diffusing sheet but also a condensing sheet or a sheet for improving light use effectiveness by utilizing a polarized light conversion layer. The light source unit 16 may be either a hot cathode fluorescent lamp or a cold cathode fluorescent lamp. Alternatively, a light emitting diode, an organic EL, and so forth, may be used as a light source. The light source unit 16 may not be a direct type but a side light type. For a side light type, a light guiding panel is used. A driving circuit (not shown), the light source unit 16, and so forth, are electrically connected to the liquid crystal panel.

In particular, the polarizer 12 has a multiple polarizer layer in this embodiment, and the polarization axis of the multiple polarizer layer is defined as the lateral direction of a screen (a direction in which the gate electrode 34 extends in FIG. 5) in this embodiment. Meanwhile, the analyzer 11 uses an iodine-stretched polarizer layer, and the polarization axis is defined as the vertical direction of a screen (a direction in which the signal electrode 36 extends in FIG. 8). The multiple polarizer layer of the polarizer 12 comprises a first polarizer layer and a second polarizer layer, the first polarizer layer having positive uniaxiality to ensure a higher degree of polarization relative to a light incoming from the forward direction (vertical direction) rather than a oblique direction, and the second polarizer layer having negative uniaxiality to ensure a higher degree of polarization relative to a light incoming from a oblique direction rather than the forward direction. For a liquid crystal layer enclosed in the liquid crystal cell 15, nematic liquid crystal material having an average elastic constant of three elastic constants referred to as Frank elastic constants, namely, a splay elastic constant K1, a twist elastic constant K2, and a bend elastic constant K3, being $10 \times 10^{-12}$ N or larger and also ratios between splay and bend elastic constants and twist and bend elastic constants, respectively, or K1/K3 and K2/K3, being ⅔ or smaller is used. This will be described below in detail.

The first polarizer layer having the above described positive uniaxiality is a layer in which molecules having an extraordinary refractive index larger than an ordinary refractive index are aligned in one direction, the layer comprising dichroic molecules each having an absorption axis in substantially parallel to a molecular long axis, in which the extraordinary refractive index has an electric field of light in parallel to the molecular long axis and the ordinary refractive index has an electric field of light perpendicular to the molecular long axis. Meanwhile, the second polarizer layer having the above described negative uniaxiality is a layer in which molecules having an extraordinary refractive index smaller than an ordinary refractive index are aligned in one direction, the layer comprising molecules each having an absorption axis being lateral to, or nearly perpendicular to, the molecular long axis.

Here, a P-polarized light having an oscillation plane (an electric field vector) in an incident plane corresponds to an extraordinary refractive index, while an S-polarized light having vertical oscillation (an electric field vector) to an incident plane corresponds to an ordinary refractive index. An S-polarized light is not dependent on an incident angle. As an S-polarized light causes an electron cloud to be distorted in a direction perpendicular to the molecular long axis, the polarized light characteristic of an S-polarized light does not depend on an incident angle. Meanwhile, a P-polarized light strongly depends on an incident light angle.

When a P-polarized light is incoming perpendicularly (an incident light angle being 0 degree), a refractive index is an extraordinary refractive index as an electric field of light is parallel to the molecular long axis. However, once the incident light angle becomes 90 degrees and accordingly, an electric field of light becomes perpendicular to a molecular long axis, a refractive index value becomes an ordinary refractive index. At an intermediate angle, ordinary and extraordinary refractions coexist, and resultantly, a refractive index strongly depends on an incident light angle.

That is, a polarizer layer which comprises dichroic molecules having an absorption axis in substantially parallel to a molecular long axis (a polarizer layer having positive uniaxiality) shows the most strong absorption only with respect to a vertical incident light, and absorption becomes less with respect to a larger incoming angle. The strength of absorption is related to a polarization degree. With a polarizing plate comprising solely a polarizer layer having positive uniaxiality, a degree of polarization with respect to an oblique incident light drops, which causes deterioration in viewing angle characteristics of a liquid crystal display device.

Meanwhile, a dichroic molecule forming a polarizer layer having negative uniaxiality has an absorption axis in an ordinary refractive index direction of a molecule, and therefore, a polarization degree does not have a strong incident light angle dependency. However, as a characteristic, a dichroic molecule forming a polarizer layer having negative uniaxiality often has a structure which has only two-fold rotation axis around a molecular long axis in a plan view. This means that a molecular polarizability takes a different values for three directions, namely, x, y, and z directions, and also that a dichroic molecule has two ordinary refractive indexes. That is, an electron cloud is distorted in two directions, and resultantly, light absorption slightly drops. Therefore, a degree of polarization relative to a vertical incident light is not as large as that of a polarizer layer having positive uniaxiality.

In view of the above, in this embodiment, the polarizer 12 has a multiple polarizer layer having a polarization degree with improved viewing angle dependency, in which the improvement is achieved by forming a polarized light from a vertical incident light by the first polarizer layer having positive uniaxiality and forming a polarized light from an oblique incident light by the second polarizer layer having negative uniaxiality. With the above, it is possible to enhance a degree of polarization with respect to a light incoming obliquely from the light source unit 16 to the polarizer 12.

Note that the polarization degree P of a polarizing plate is obtained by measuring a luminance ($L_{90}$) with two identical polarizing plates placed vertical to each other and a luminance ($L_0$) with two identical polarizing plates placed in parallel to each other. The polarization degree p of a polarizing plate is expressed in the expression (1) below.

[Expression 1]

$$P = \sqrt{\frac{L_0 - L_{90}}{L_0 + L_{90}}} \quad (1)$$

A degree of polarization for a oblique direction is measured using a polarizing plate which is placed at a slant relative to a light source so that a light is incoming obliquely.

A representative example of a polarizer layer having positive uniaxiality is a generally, widely used iodine stretched polarizing plate. This is formed by dying polyvinyl alcohol macromole with iodine molecule and then stretching so that a principal chain of polyvinyl alcohol is aligned in one direction and iodine molecules are aligned in one direction. For the polarizing plate, it is considered that, rather than iodine has dichroic nature, an electric field of light in parallel to the principal chain which is aligned in one direction as a result of stretching polyvinyl alcohol causes oscillation polarization and that a light is transferred onto indine-type dye and transformed into heat to be absorbed. Note that, although being known as a dye-type polarizer layer, a polarizer layer using dichroic dye or the like which has an azo-type rod-like molecule is similarly a polarizer layer having positive uniaxiality as having an absorption axis in the molecular long axis direction.

Meanwhile, as a polarizer layer having negative uniaxiality, a compound disclosed in WO97/39380, indanthrone derivative, compound obtained by sulfonating dibenz imidazole derivative of perylen tetra carboxylic acid or naphthalene tetra carboxylic acid derivative is available. Also available is a dye represented by C. I. direct blue 67, known as chromonic dye. These develop a lyotropic liquid crystal phase in aqueous solution with a dye concentration about 5 to 30 weight %. However, these are not exclusive examples of material of a polarizer layer having negative uniaxiality. As developing a lyotropic liquid crystal phase in aqueous solution with a dye concentration about 5 to 30 weight %, these materials can make a polarizer layer with dye molecules aligned when these materials are coated with a shear stress.

Note that a dye film formed by coating dichroic dye in a lyotropic liquid crystal phase does not always make a polarizer layer having negative uniaxiality. For example, a polarizing plate formed by coating disazo-type dye with a shear stress may make a polarizer layer having positive uniaxiality.

Whether a resultant polarizer layer shows negative or positive uniaxiality depends on a structure of dye moleculars and an orientation direction. As material of a polarizer layer having negative uniaxiality, there is available, e.g., polymer dye having a molecular structure being dichroic in a side chain direction as opposed to the principal chain and also a molecular structure having a smaller extraordinary refractive index than an ordinary refractive index. There is also available a photosensitive dye film of a type obtained by irradiating a polarized ultraviolet light. Further, an aligning method using an alignment layer may be also used. In aligning using an alignment layer, it is not always necessary to use material in ea chromonic liquid crystal phase as material of a polarizer layer having negative uniaxiality.

Further, for a polarizer layer having negative uniaxiality, self-assembled layer using a command surface is available. For example, a layer (command surface) having photoactive molecules is formed on a substrate and irradiated by a linear polarized light which is absorbed by the photoactive molecules. As a result, photoactive molecules in the film are re-aligned such that the molecular long axis thereof is aligned perpendicular to the polarization axis of the irradiated light. Then, when dye solution is coated on the film, dye alignment is induced. Another method available is such that a photo-cross-linkage functional group is given to dye molecules or photosensitive compound in a chromonic liquid crystal phase, similar to dye, is applied to dye molecules, so that alignment control and crosslink formation are accomplished at the same time through irradiation of polarized ultraviolet light. That is, a film forming method is not limited to any specific one.

The polarizer 12 of a liquid crystal display device according to this embodiment has a multiple polarizer layer formed by attaching, e.g., a first polarizer layer having positive uniaxiality due to an iodine stretched polarizer layer and a second polarizer layer having negative uniaxiality (e.g., C. I. direct blue 67), using an adhesive agent having no optical anisotropy. In the multiple polarizer layer, the second polarizer layer having negative uniaxiality is laminated in a position closer to the liquid crystal cell 15 than the first polarizer layer having positive uniaxiality is. A structure with the second polarizer layer provided closer to the liquid crystal cell 15 is superior in terms of a polarization degree with respect to an oblique incident light from the light source unit 16 to a structure in which the first polarizer layer is provided closer to the liquid crystal cell 15.

The first polarizer layer has a protection layer (e.g., triacetylcellulose, cyclo-olefine polymer) on the side opposite from the second polarizer layer, and the second polarizer layer has, as a protection layer formed on the side opposite from the first polarizer layer, optically substantially isotropic polymer having a negligibly small birefringence phase difference in an in-plane and thickness directions. The inventors of the present invention have found that a structure in which the second polarizer layer is formed on the liquid crystal cell 15 side provides a superior polarization degree with respect to an oblique incident light from the light source unit 16 than a structure in which the first polarizer layer is formed on the liquid crystal cell 15 side.

Note that a polarizing plate having a multiple polarizer layer, similar to that of the polarizer 12, may be used for an analyzer on an observer side. As a polarizer layer having positive uniaxiality, a polarizer layer utilizing dyes, rather than an iodine stretched type, may be used.

As an alternative structure, an optically substantially isotropic polymer having a negligibly small birefringence phase difference in an in-plane and thickness directions may be provided as a protection layer between the first polarizer layer showing positive uniaxiality and the second polarizer layer showing negative uniaxiality. Alternatively, the first polarizer layer and the second polarizer layer are separately formed and attached to a film or a panel member having no (negligibly small) birefringence phase difference in the thickness direction. When a member such as a protection layer or an adhesive agent is present between the first and second polarizer layers or between the multiple polarizer layer and the liquid crystal cell 15, an optically substantially isotropic member having a negligibly small birefringence phase difference in the in-plane and thickness directions is used for the member. With the above, viewing angle characteristics of the polarizer 12 having a multiple polarizer layer can be improved more effectively.

As described above, the polarizer 12 in this embodiment has a multiple polarizer layer comprising a first polarizer layer showing positive uniaxiality and a second polarizer layer showing negative uniaxiality. The first polarizer layer showing positive uniaxiality is a layer in which an extraordinary refractive index in a long axis direction of molecules causing polarization is larger than an ordinary refractive index and molecules each having an absorption axis in substantially parallel to a molecular long axis is aligned in one direction. The second polarizer layer showing negative uniaxiality is a layer in which an ordinary refractive index of molecules causing polarization is larger than an extraordinary refractive index and molecules each having an absorption axis in substantially parallel to the ordinary refractive index is aligned in one direction. A medium (adhesive agent or a protection layer) between two kinds of polarizer layers, namely, the first and second polarizer layers, is optically substantially isotropic in the in-plane and thickness directions. Also, the polarizer 12 between the light source unit 16 and the liquid crystal cell 15 has a multiple polarizer layer comprising a first polarizer layer showing positive uniaxiality and having a higher degree of polarization with respect to a vertical incident light and a second polarizer layer showing negative uniaxiality and having a higher degree of polarization with respect to an oblique incident light (in particular, an incoming light at a large angle of 45 degrees or larger).

With the above, a high value can be obtained as a contrast ratio in the forward direction by the first polarizer layer showing positive uniaxiality, and a high contrast ratio can be maintained as a contrast ratio in a oblique direction as polarization is mainly attained by the second polarization layer showing negative uniaxiality.

Note that, although a polarizer layer showing positive uniaxiality presents almost zero degree of polarization with respect to a light incoming at a large angle, such as an angle of 45 degrees or larger, as a sum of a polarization degree of the first polarization layer showing positive uniaxiality and that of the second polarization layer showing negative uniaxiality can be obtained, a high contrast ratio can be obtained with respect to a light incoming at an angle up to almost 45 degrees.

In the following, specific optical characteristic of a multiple polarizer layer in the polarizer 12 according to this embodiment will be described in further detail.

Figure 6:
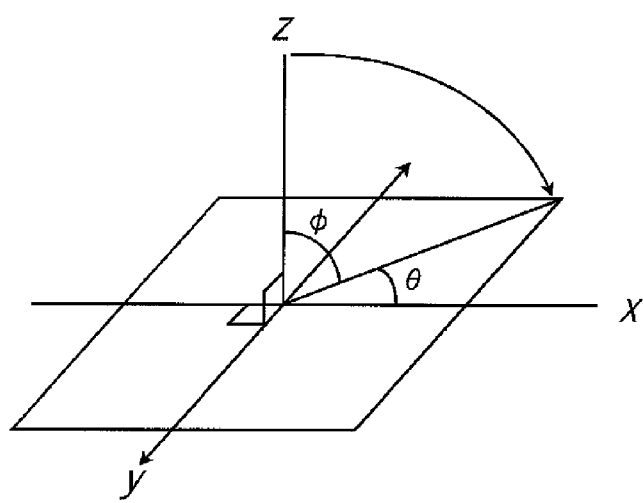
FIG. 6 is a diagram explaining definition of an absorption axis of a polarizer layer and that of an azimutal angle and a polar angle.

The x, y, z axes are defined as shown FIG. 6. That is, the absorption axis of the polarizer layer is defined as a y axis; the polarization axis is defined as an x axis; and while defining a surface of a polarizer layer as an xy plane, a direction vertical to the xy plane is defined as a z axis. That is, while defining the z axial direction as a forward direction with $\phi=0$ degree, a polar angle is defined. Also, an angle $\theta$ on the xy plane, which is formed based on the x axis so as to become wider in the counter-clockwise direction is defined as an azimutal angle $\theta$.

A vertical incident is a light incoming with $\phi=0$ degree in the z axis direction in FIG. 6; an oblique incident is a light incoming with $0<\phi<90$ degrees in FIG. 2 and defined for directions at all azimutal angles. A large angle incident refers to a light incoming at a large angle $\phi$, specifically, substantially 45 degrees or larger in this embodiment.

Figure 7:
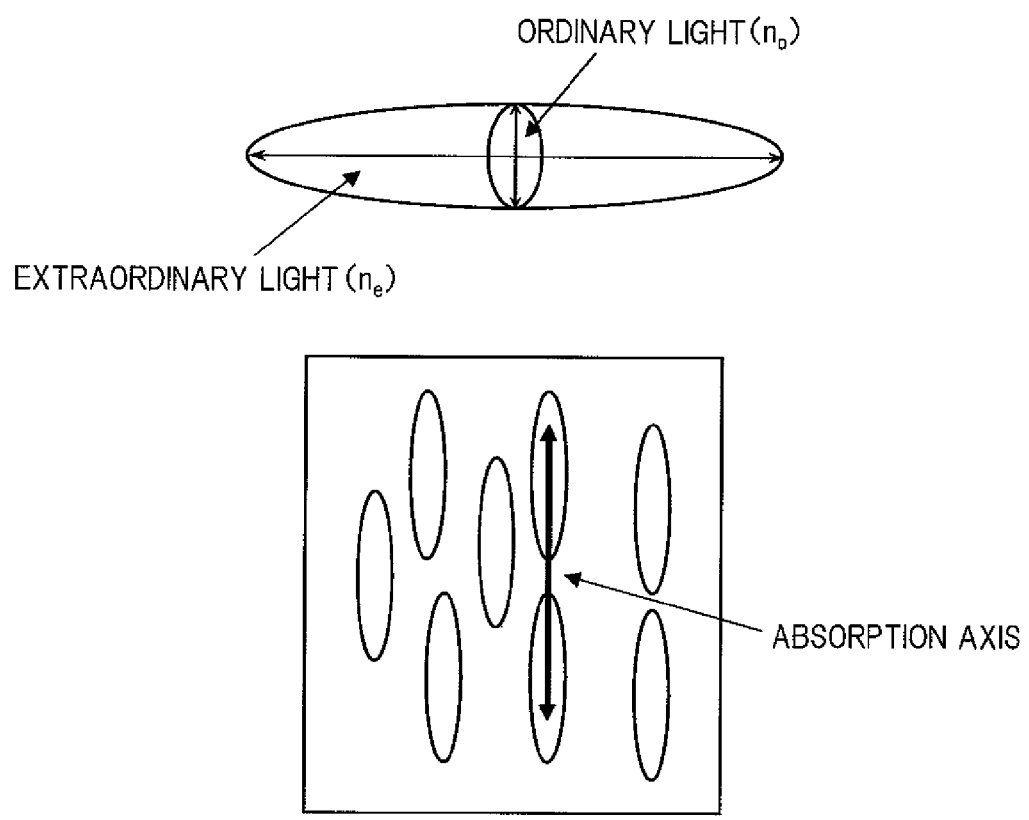
FIG. 7 is a diagram showing a first polarizer layer showing positive uniaxiality according to one embodiment of the present invention.

FIG. 7 shows a polarizer layer showing positive uniaxiality according to this embodiment. A molecule causing polarization shows a substantially rod-like molecular shape, as shown in FIG. 7, and a molecular long axis direction corresponds to an extraordinary refractive index direction showing angle dependency.

An absorption axis appears in the extraordinary axial direction, that is, the y axis. As the absorption axis is the extraordinary light axis showing angle dependency, absorption strongly depends on an angle, and resultantly, polarization shows angle dependency.

Figure 8:
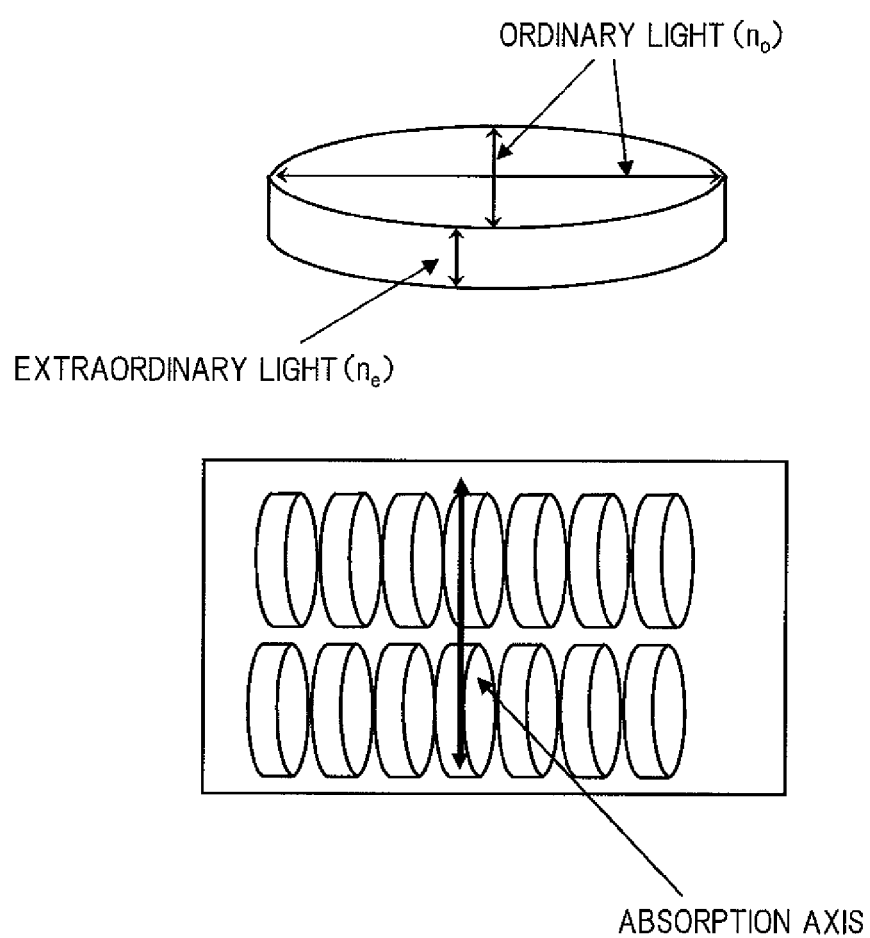
FIG. 8 is a diagram showing a second polarizer layer showing negative uniaxiality according to one embodiment of the present invention.

FIG. 8 shows a polarizer layer having negative uniaxiality. A molecule causing polarization shows a flat column shape, that is, a pellet molecular shape, as shown in FIG. 8, in which the in-plane direction of the column corresponds to an ordinary light, while the height direction corresponds to an extraordinary light axis. The transition moment of a functional group which absorbs light is substantially horizontal with respect to an ordinary light plane. In a polarizer layer aligned having an ordinary light axis in the z axial direction, the absorption axis appears in the x and z axial directions. Therefore, polarization is almost always caused in the y axial direction in the polarizer layer, so that angle dependency of polarization is suppressed.

Note that for a molecule being uniaxial, the refractive indexes in the x and z axial directions are equal to each other, and the absolute value of a polarization degree is relatively high. For a molecule being biaxial, the molecules are not aligned such that the x and z axial directions thereof are exactly matched (due to occurrence of hindered rotation of intramolecule rotation), and the absolute value itself of a polarization degree tends to be slightly lower, though a polarization degree with respect to a light incoming at a large angle can be made higher than that of a polarizer layer having positive uniaxiality.

In a multiple polarizer layer of the polarizer 12 according to this embodiment, these two kinds of polarizer layers, namely, the first and second polarizer layers, are laminated such that the respective absorption axes are aligned in parallel to each other.

For example, a polarizer layer having negative uniaxiality is formed on a transparent base film made of cyclo-olefine polymer. That is, initially, a lyotropic liquid crystal phase developing chromonic phase is formed by sulfonating indanthrone derivative, dibenz imidazole derivative of perylen tetra carboxylic acid, or naphthalene tetra carboxylic acid derivative. Then, the resultant lyotropic liquid crystal layer is coated using a shear stress. The coated lyotropic liquid crystal layer is dried, and then insolubilized through ion exchange using barium chloride aqueous solution. As a result, a polarizer layer having negative uniaxiality is formed. The film thickness after drying is about 150 µm. The resultant layer and an iodine polarizer layer having positive uniaxiality (a film formed by attaching a film formed by dying polyvinyl alcohol polymer with iodine and then stretching to triacetylcellulose) are adhered to each other using acrylic pressure sensitive adhesive agent such that the absorption axes thereof are aligned in parallel to each other, whereby a multiple polarizer layer is formed. For the above described cyclo-olefine polymer, a base film substantially no birefringence in the in-plane and thickness directions is used.

Further, a multiple polarizer layer having a polarization degree being 99.8 degrees or larger for a direction at a polar angle and an azimutal angle both being 45 degrees is used. In order to adhere a polarizer layer showing negative uniaxiality and a polarizer layer showing positive uniaxiality together, a pressure sensitive adhesive referred also as adhesive is used. The pressure sensitive adhesive is made using, e.g., acrylic polymer, silicon-based polymer, polyester, polyurethane, polyether, or the like, as base polymer. Preferably, pressure sensitive adhesive which is superior in optical transparency, has appropriate wettability and cohesive force, and will not be removed, that is, not float or be separated, due to heat or humidity is used. Further preferably, pressure sensitive adhesive having a heat shrinkage rate not significantly different from that of two polarizer layers or that of a base film holding the polarizer layer is used. Note that, as base polymer for acrylic pressure sensitive adhesive, generally, acrylic copolymer having a weight average molecular amount being 100,000 or larger and formed by combining alkyl ester of acrylic acid having alkyl group having 20 or a smaller number of carbons, such as, methyl group, ethyl group, butyl group, and so forth, and acrylic monomer containing a functional group made of (meth)acrylic acid, (meth)acrylic acid hydroxy ethyl, and so forth, such that a glass transition temperature is preferably 25° C. or lower, more preferably 0° C. or lower, is useful.

In the above, improvement of viewing angle characteristics by utilizing a polarizer 12 having a multiple polarizer layer has been described. However, even in this case in which the polarizer 12 is used, light leakage will occur due to light scattering in a oblique direction by a liquid crystal layer enclosed in the liquid crystal cell 15. This is because an oblique incident light to a liquid crystal layer is partially depolarized even though a degree of polarization by the polarizer 12 with respect to an oblique incident light is improved. When a degree of polarization by the polarizer 12 with respect to an oblique incident light is low, a major cause of light leakage is a lower degree of polarization by the polarizer 12 with respect to an oblique incident light, rather than light scattering by a liquid crystal layer. However, when a relatively high degree of polarization is maintained with respect to an oblique incident light due to use of a multiple polarizer layer, partial depolarization by a liquid crystal layer is a major cause of light leakage from a liquid crystal panel.

In this embodiment in particular, by using a polarizer 12 having a relatively high degree of polarization with respect to an oblique incident light in a liquid crystal display device and also by reducing light leakage in a oblique direction from a liquid crystal layer, light leakage in a oblique direction in a black state is suppressed. In the following, nematic liquid crystal material of a liquid crystal layer enclosed in the liquid crystal cell 15 will be described in detail.

The values of splay, twist, and bend Frank elastic constants of nematic liquid crystal material are expressed as below, using (L-W)/W defined by a liquid crystal molecule length (L) and width (W) and a function of quadratic and quartic Legendre polynomials ($P_2$, $P_4$)

[Expression 2]

$$\frac{K_1}{K} = 1 + \Delta - 3\Delta' \frac{P_4}{P_2} \quad (2)$$

[Expression 3]

$$\frac{K_2}{K} = 1 - 2\Delta - \Delta' \frac{P_4}{P_2} \quad (3)$$

[Expression 4]

$$\frac{K_3}{K} = 1 + \Delta + 4\Delta' \frac{P_4}{P_2} \quad (4)$$

wherein

[Expression 5]

$$K = \frac{K_1 + K_2 + K_3}{3} \quad (5)$$

[Expression 6]

$$\Delta = \frac{2\{(L-W)/W\}^2 - 2}{7\{(L-W)/W\}^2 + 20} \quad (6)$$

[Expression 7]

$$\Delta' = \frac{90}{16} \frac{3\{(L-W)/W\}^2 - 8}{7\{(L-W)/W\}^2 + 20} \quad (7)$$

[Expression 8]

$$P_2 = \frac{1}{2}\langle 3\cos^2\theta - 1\rangle \quad (8)$$

[Expression 9]

$$P_4 = \frac{1}{8}\langle 35\cos^4\theta - 30\cos^2\theta + 3\rangle \quad (9)$$

There is a tendency that a larger value of (L-W)/W, that is, a longer liquid crystal molecule, results in a larger increase of the bend elastic constant K3 and a larger decrease of the twist elastic constant K2. Further, an order parameter S depends on temperature. For example, an order parameter is expressed by the expression (10).

[Expression 10]

$$P_2 \equiv S = \left(1 - 0.98 \frac{TV^2}{T_{NI} V_{NI}^2}\right)^{0.22} \quad (10)$$

wherein V refers to a molar volume of a molecule and $T_{NI}$ refers to a transition temperature between nematic liquid crystal phase and isotropic phase (liquid). Material property, such as anisotropy of refractive index, elastic constant, anisotropy of dielectric constant, and so forth, appearing in a liquid crystal phase increases as temperature decreases from a transition temperature. As to an elastic constant, according to the above mentioned expression, K3 has the strongest temperature dependency. That is, the lower the temperature is, the more remarkably the K3 value increases.

Figure 9:
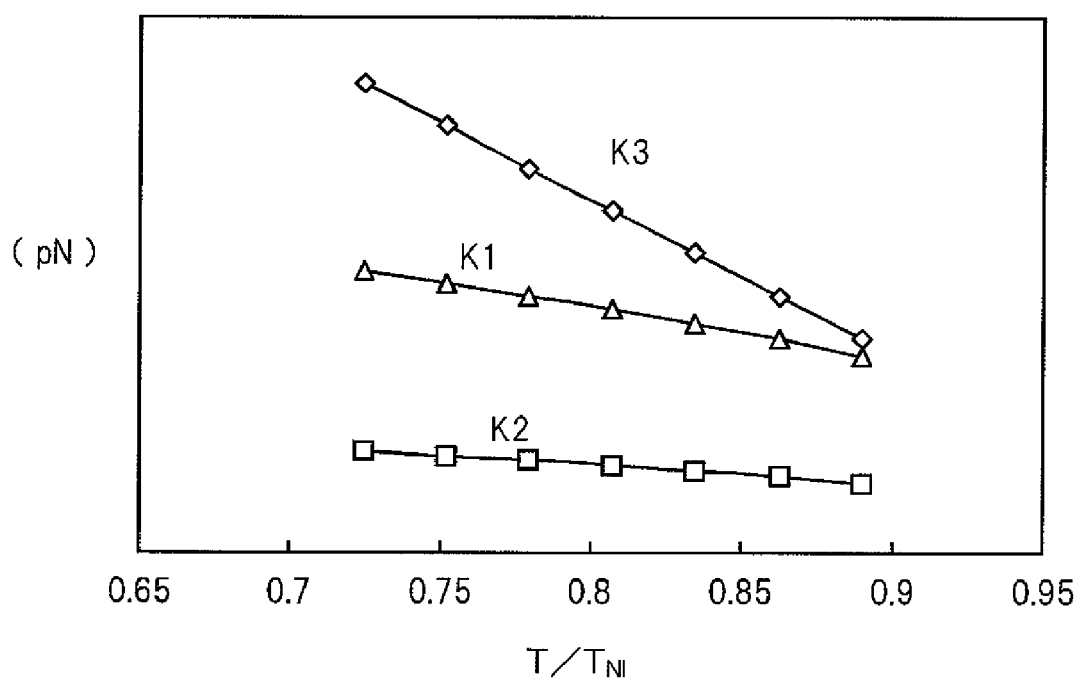
FIG. 9 is a diagram showing temperature dependency of an elastic constant.

The above described relationship is expressed as shown in FIG. 9. That is, the K1 and K3 values become closer to each other as the temperature changes toward a nematic-isotropic phase transition temperature, and the K3 value remarkably increases as the temperature decreases. While utilizing such a change in temperature, liquid crystal material having K1, K2, K3 values in a preferable range at a temperature, e.g., 313 K, at which a liquid crystal display device is practically used is used. This is because, as to an application for in-room viewing, such as a television, the condition needs not be always satisfied in a wider range of temperature, as the liquid crystal panel is maintained at a substantially constant temperature due to the heat from the backlight in a normal room temperature range.

Generally, the length (L) of a liquid crystal molecule is considered between 2 and 3 nm and the width between 0.4 and 0.5 nm. A liquid crystal molecule has a mesogen structure (nematic liquid crystal comprising a rigid cyclic structure with two to four cycles being practical; cyclic groups are bonded to each other either directly or via a spacer group, such as —CH$_2$O—, ester group, ethylene group, or the like; a cycle group generally includes cyclohexylene, phenylene, or naphthalene group, and may include a heterocyclic structure containing nitrogen or oxygen) and a polarity group or an alkyl group bonded to the respective ends of the mesogen structure. When a molecule is made longer using a mesogen structure, the nematic-isotropic transition temperature increases; the order parameter also increases; and the elastic constant also increases. When a molecule is made longer using an alkyl group and the number of carbons exceeds seven, free rotation between carbons in single bond is activated and an elastic constant does not remarkably increase. Odd-even effect of a carbon number is known. This is proved not only by theoretical analysis but on experiment.

Practical liquid crystal material is a composite of many kinds of compounds (mainly liquid crystal compound, though not necessary including solely liquid crystal compound), and the above described material property does not always hold an additive law because attraction and repulsion acting on each liquid crystal molecule, such as the type and orientation of a polar group of each liquid crystal compound, a location placed in a mesogen structure (in a lateral direction or in a molecule long axis direction), has remarkable influence. As described above, an elastic constant of nematic liquid crystal material is constrained by a common parameter, such as the length and width of liquid crystal molecule, temperature, and so forth, and an elastic constant of nematic liquid crystal material generally used substantially holds a relationship 0.5<K3/K1<3.0 and 0.5<K2/K1<0.8.

Light leakage intensity $L_{leak}$ in the forward direction due to a liquid crystal layer is expressed by the expression (11) below.

[Expression 11]

$$L_{leak} \propto \frac{\{\Delta n(n_e - n_o)\}^2 d}{K} \quad (11)$$

wherein d refers to the thickness of a liquid crystal layer. In order to reduce light leakage intensity, it is effective to increase the average K of three elastic constants, namely, a splay elastic constant K1, a twist elastic constant K2, and a bend elastic constant K3, or to reduce anisotropy of refractive index (a difference between an extraordinary refractive index $n_e$ and an ordinary refractive index $n_o$). Increase of the average of the three elastic constants or reduction of anisotropy of refractive index (a difference between an extraordinary refractive index and an ordinary refractive index) is similarly effective to reduce light leakage in a oblique direction from a liquid crystal layer in a black state. Specifically, the average elastic constant K is increased to 10×10$^{-12}$ N or larger. Preferably, the anisotropy of refractive index is set to, specifically, between 0.07 and 0.09.

Meanwhile, a differential scattering cross section which exactly expresses a scattering intensity of liquid crystal is expressed by the expression (12) below, using a scattering angle $\phi$, a splay elastic constant K1, and a twist elastic constant K2.

[Expression 12]

$$\frac{d\sigma}{d\Omega} = \left(\frac{\omega \Delta \varepsilon}{4\pi c^2}\right)^2 k_B T \left[\frac{\cos^2(\phi/2)}{K_1 q_\perp^2} + \frac{\sin^2(\phi/2)}{K_1 q_\perp^2}\right] \sim \cot^2(\phi/2) + K_1/K_2 \quad (12)$$

As it is assumed, based on the above-described relationship, that K1/K2 in the rightmost term is between about 1.25 and 2.0, the differential scattering cross section, or a scattering intensity of liquid crystal, is mainly affected by the term related to a scattering angle when the scattering angle for an incoming light is substantially 40 degrees or smaller, though the term K1/K2 comes to have an increased influence with respect to a light incoming at a larger angle.

According to liquid crystal physics, it is obvious that a light scattering intensity of nematic phase is largest when polarizing plates are placed perpendicular to each other. When a conventional polarizing plate of which polarization degree is not very high with respect to an oblique incident light is used, light leakage is caused mainly due to a polarization degree which is not very high rather than scattering light. However, when a degree of polarization with respect to an oblique incident light is high, it is important to reduce the scattering intensity as much as possible. For this purpose, reduction of the value K1/K2 is effective. Although a range of controllable values is limited due to a ratio of the splay and twist elastic constants, it is effective to set K1/K2 to 1.5 or smaller with respect to a light incoming to a liquid crystal cell at an angle about 80 degrees as the maximum incident angle relative to a liquid crystal cell is considered about 80 degrees.

Here, for an IPS type liquid crystal display device, increase of a twist elastic constant K2 is not preferable as the twist elastic constant K2 mainly affects a threshold voltage (Vc), as shown in the expression (13).

[Expression 13]

$$Vc \propto \sqrt{\frac{K_2}{\varepsilon_0 |\Delta \varepsilon|}} \quad (13)$$

In the expression (13), $\varepsilon_o$ refers to a vacuum dielectric constant, and $\Delta E$ refers to anisotropy of a dielectric constant of liquid crystal. Specifically, as a voltage larger than a practical driving voltage is required once a twist elastic constant K2 exceeds 8×10$^{-12}$ N, a twist elastic constant K2 is set to 8×10$^{-12}$ N or smaller. A splay elastic constant K1, which is within a range not exceeding 1.5 times the twist elastic constant K2, is set to 12×10$^{-12}$ N or smaller. A bend elastic constant K3, which makes an average elastic constant K larger, is desired to be set to a value twice or larger the twist elastic constant K2 (i.e., K2/K3/<=½).

Meanwhile, light scattering intensity in the forward direction is expressed by the expression (14) below in "M. Yoneya et al., J. Appl. Phys., 98 (2005), p. 016106".

[Expression 14]

$$I \propto \frac{E_0^2}{2}\left(\frac{2\pi}{\lambda_0}\right)^4 \left(\frac{\Delta\varepsilon}{4\pi R}\right)^2 \frac{Vk_B T}{K_3} \quad (14)$$

As the bend elastic constant K3 has large contribution, as shown in expression (14), it is preferable to employ a liquid crystal material having a large bend elastic constant in order to reduce light leakage in the forward direction.

Note that the ratio, or K3/K1, between the bend elastic constant and the splay elastic constant is substantially equal to the ratio L/D between the length and width of a molecule. As a longer and more rigid liquid crystal molecule leads to a larger K3 value, in order to make a liquid crystal molecule having a sufficiently large K3 value, preferably, the value K3/K1 is equal to 3/2 or larger (that is, K1/K3<=2/3). Further, when a bend elastic constant K3 is 1.5 times or larger the splay elastic constant K1 and the splay elastic constant K1 increases, a viscosity factor resultantly increases. This is disadvantageous in view of a response speed of a liquid crystal display device. Therefore, it is preferable to use liquid crystal material having a splay elastic constant K1 being $10\times10^{-12}$N or smaller. As described above, the upper limit of an elastic constant is determined in terms of a driving voltage and a response speed.

In view of the above, in order to reduce light leakage in the forward direction, the average elastic constant and the elastic constant K3 are to be increased. Meanwhile, in order to reduce oblique light leakage, a material having a small elastic constant K1 is used while the average elastic constant is increased.

Specifically, in order to reduce oblique light leakage within a range of practical values taken by the respective elastic constants, liquid crystal material which satisfies a condition that the average elastic constant of three elastic constants is $10\times10^{-12}$N or larger and the K1 value is $10\times10^{-12}$ N or smaller is used.

As a specific value range of the respective elastic constants which satisfy the above described conditions, the splay elastic constant K1 between $9.0\times10^{-12}$ N and $10.0\times10^{-12}$ N, the twist elastic constant K2 between $6.0\times10^{-12}$ N and $8.0\times10^{-12}$N, and the bend elastic constant K3 being $15.0\times10^{-12}$ N or larger are possible. The upper limit of the bend elastic constant K3 is $20.0\times10^{-12}$ N, similar to the upper limit of the bend elastic constant K3 which can be taken by general nematic liquid crystal material. Note that, in order to increase mainly the bend elastic constant K3, material having a nematic-isotropic transition temperature being at least 363 K or higher is preferably used. This is because the bend elastic constant K3 increases more remarkably when the practical temperature range becomes lower than the transition temperature as the bend elastic constant K3 has the strongest temperature dependency. When the practical temperature of a liquid crystal display device is about 313 K due to the heat from the light source, liquid crystal material having a transition temperature being 50 K or higher is preferred.

Note that, for measurement of an elastic constant, e.g., an electric field method and a magnetic field method (described in e.g., Liquid Crystal Basic, pp 216 to 220, Okano Motoji, Kobayashi Syunsuke, Baifukan) are available. Although a slight difference in values caused depending on a measurement method in use is tolerated, a measured value may result in different due to inconsistent film thickness of a measured cell, correlation length of a boundary between a liquid crystal layer and a cell substrate (alignment layer), influence of reference material, or the like. In this specification, in which light leakage due to light scattering is a problem to be solved, a value measured by a light scattering method (disclosed in, e.g., Physical Properties of Liquid Crystal Materials, pp 81 to 86, W. H. de Jeu, Gordon and Breach, 1980) is used, for it is preferable.

In the following, first to fifth examples using a liquid crystal display device according to the above described embodiment will be described. Note that the values of elastic constants in the above described embodiment and those in the examples and comparative examples in this specification are obtained at normal temperature, or 313 K.

FIRST EXAMPLE

In the first example, nematic liquid crystal composite having a nematic-liquid phase transition temperature being 368 K, anisotropy of refractive index being 0.085 (wavelength 546 nm, 373 K) K1 being $9.9\times10^{-12}$N, K2 being $7.2\times10^{-12}$N, and K3 being $15.8\times10^{-12}$ N is enclosed in the liquid crystal cell 15 of a liquid crystal display device according to the above described embodiment.

A panel contrast ratio of a liquid crystal display device in the first example is 1520; and a contrast ratio for a direction at an in-plane azimutal angle of a polarization axis being 45 degrees and a polar angle being 45 degrees is 170.

Note that a panel contrast ratio (a front contrast ratio) is defined as a contrast ratio unique to a liquid crystal panel, which is defined based on the minimum luminance and maximum luminance with respect to an identical light source intensity without light modulation by a backlight source. In measurement, a value is obtained by dividing the maximum luminance by the minimum luminance when an entire image on a screen is displayed at the maximum and minimum luminance, respectively, with respect to an identical light source intensity. Alternatively, while displaying a background image at the minimum luminance (the minimum tone) and a window at the maximum luminance (the maximum tone) in a part of the same screen, a value is obtained by dividing the maximum luminance by the minimum luminance of the background image. Specifically, when an image processing engine for correcting y in accordance with the luminance of an image displayed on the screen is used, the method first mentioned above utilizing a contrast in entire displaying may be used, and when an image processing engine is not used, either method mentioned first or second may be used. When a practical contrast is evaluated while taking into consideration of an image engine, the method mentioned second in the above is used for measurement. In the respective examples and comparative examples in this specification, a contrast ratio measured using the first mentioned method is used. Note that as long as the panel control ratio is 1500:1 or larger, an IPS type liquid crystal display device with very preferable image quality can be provided. This is a value targeted by the present inventors as a result of sensitivity evaluation.

SECOND EXAMPLE

In the second example, nematic liquid crystal composite having anisotropy of refractive index being 0.084 (wavelength 546 phase, 313 K), K1 being $9.2\times10^{-12}$N, K2 being $6.7\times10^{-12}$N, and K3 being $17.4\times10^{-12}$ N, and a nematic-liquid phase transition temperature being 384 K is enclosed in the liquid crystal cell 15 of a liquid crystal display device according to the above described embodiment.

A front contrast ratio in the second example is 1610; and a contrast ratio for a direction at the azimuthal angle and the polar angle both being 45 degrees ($\phi=\theta=45°$) is 200.

THIRD EXAMPLE

In the third example, nematic liquid crystal composite having anisotropy of refractive index being 0.091 (wavelength 546 nm, 313 K), K1 being $9.8\times10^{-12}$N, K2 being $7.8\times10^{-12}$N, and K3 being $17.6\times10^{12}$ N, and a nematic-liquid phase transition temperature being 390 K is enclosed in the liquid crystal cell 15 of a liquid crystal display device according to the above described embodiment.

A front contrast ratio in the third example is 1800; and a contract ratio for a direction at the azimutal angle and the polar angle both being 45 degrees is 210.

FOURTH EXAMPLE

In the fourth example, nematic liquid crystal composite having anisotropy of refractive index being 0.078 (wavelength 546 nm, 313 K), K1 being $9.6\times10^{-12}$ N, K2 being $6.4\times10^{-12}$ N, and K3 being $15.6\times10^{-12}$ N, and a nematic-liquid phase transition temperature being 363 K is enclosed in the liquid crystal cell 15 of a liquid crystal display device according to the above described embodiment.

A front contrast ratio in the fourth example is 1560; and a contrast ratio for a direction at the azimutal angle and the polar angle both being 45 degrees is 175.

FIFTH EXAMPLE

In the fifth example, nematic liquid crystal composite having anisotropy of refractive index being 0.088 (wavelength 546 nm, 313 K), K1 being $9.7\times10^{-12}$N, K2 being $7.0\times10^{-12}$ N, and K3 being $16.5\times10^{-12}$ N, and a nematic-liquid phase transition temperature being 369 K is enclosed in the liquid crystal cell 15 of a liquid crystal display device according to the above described embodiment.

A front contrast ratio in the fifth example is 1600; and a contract ratio for a direction at the azimutal angle and the polar angle both being 45 degrees is 180.

FIRST COMPARATIVE EXAMPLE

As a first comparative example, while using a nematic liquid crystal composite mentioned in the first example, a liquid crystal display device having a lower polarizing plate having a conventional iodine stretched polarizer layer, instead of the polarizer 12 having a multiple polarizer layer, is formed. A front contrast ratio is 1360; and a contrast ratio for a direction at the azimutal angle and the polar angle both being 45 degrees is 40. Note that a polarization degree of an iodine stretched polarizing plate for a direction at the azimutal angle and the polar angle both being 45 degrees is 98%. For a liquid crystal layer of an IPS type liquid crystal display device, in which intensity of light scattering toward the front surface caused by an oblique incident light is high, it is effective for increasing the front contrast ratio in order to increase a degree of polarization of a composite polarizer layer with respect to an oblique incident light.

SECOND COMPARATIVE EXAMPLE

As a second comparative example, nematic liquid crystal composite having anisotropy of refractive index being 0.105 (wavelength 546 nm, 313 K), K1 being $8.5\times10^{-12}$ N, K2 being $4.3\times10^{-12}$ N, K3 being $9.8\times10^{-12}$N, K3/K1 being 1.15, and a nematic-liquid phase transition temperature being 343 K is enclosed in the liquid crystal cell 15 of a liquid crystal display device according to the above described embodiment. A front contrast ratio in the second comparative example is 850; and a contrast ratio for a direction at the azimutal angle and the polar angle both being 45 degrees is 50.

THIRD COMPARATIVE EXAMPLE

Further, as a third comparative example, nematic liquid crystal composite having anisotropy of refractive index being 0.091 (wavelength 546 nm, 313 K), K1 being $11.2\times10^{-12}$N, K2 being $9.0\times10^{-12}$ N, K3 being $17.8\times10^{-12}$ N, and a nematic-liquid phase transition temperature being 343 K is enclosed in the liquid crystal cell 15 of a liquid crystal display device according to the above described embodiment. A panel contrast in this comparative example is 1400; and a contrast ratio for a direction at the azimutal angle and the polar angle both being 45 degrees is 100.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A liquid crystal display device, comprising:
   a liquid crystal panel having two substrates holding a liquid crystal layer in-between and two polarizing plates placed outside the two substrates; and
   a light source unit for emitting light toward the liquid crystal panel, wherein
   a liquid crystal molecule in the liquid crystal layer is rotated by applying an electric field in a direction of a plane in parallel to the two substrates,
   the polarizing plate placed on the light source unit side has a multiple polarizer layer formed thereon, the multiple polarizer layer including a first polarizer layer having a higher polarization degree with respect to a light incoming from a forward direction than a polarization degree with respect to a light incoming from a oblique direction and a second polarizer layer having a higher polarization degree with respect to a light incoming from a oblique direction than a polarization degree with respect to a light incoming from a forward direction is formed on, and
   an average elastic constant of a splay elastic constant K1, a twist elastic constant K2, and a bend elastic constant K3 of liquid crystal material enclosed in the liquid crystal layer is equal to $10\times10^{-12}$ N or larger and satisfies a relationship of $K1/K2 \leqq =1.5$.
2. The liquid crystal display device according to claim 1, wherein
   the first polarizer layer is formed using a polarizer layer having positive uniaxiality,
   the second polarizer layer is formed using a polarizer layer having negative uniaxiality, and
   the first polarizer layer and the second polarizer layer are laminated in the multiple polarizer layer such that absorption axes thereof are aligned in parallel to each other.
3. The liquid crystal display device according to claim 2, wherein the splay elastic constant K1, the twist elastic constant K2, and the bend elastic constant K3 satisfy a relationship of $K1/K3 <= 2/3$ and $K2/K3 <= 1/2$.

4. The liquid crystal display device according to claim 3, wherein
the splay elastic constant K1 is equal to or smaller than $12\times10^{-12}$ N, and
the twist elastic constant K2 is equal to or smaller than $8\times10^{-12}$ N.

5. The liquid crystal display device according to claim 4, wherein the splay elastic constant K1 is equal to or smaller than $10\times10^{-12}$ N.

6. The liquid crystal display device according to claim 5, wherein
the splay elastic constant K1 is in a range between $9\times10^{-12}$ N and $10\times10^{-12}$ N,
the twist elastic constant K2 is in a range between $6\times10^{-12}$ N and $8\times10^{-12}$ N, and
the bend elastic constant K3 is equal to or larger than $15\times10^{-12}$ N.

7. The liquid crystal display device according to claim 2, wherein the second polarizer layer is placed in a position closer to the liquid crystal layer than the first polarizer layer is in the multiple polarizer layer.

8. The liquid crystal display device according to claim 7, wherein the multiple polarizer layer has an optically substantially isotropic layer between the first polarizer layer and the second polarizer layer.

9. The liquid crystal display device according to claim 2, wherein the polarizing plate placed on a side of the light source unit has a polarization degree being 99.8 or larger with respect to a light incoming from a direction at an azimutal angle being 45 degrees and a polar angle being 45 degrees relative to a polarization axis in a plane of the polarizing plate.

10. The liquid crystal display device according to claim 2, wherein anisotropy of refractive index of the liquid crystal material is between 0.07 and 0.09.

* * * * *